Jan. 10, 1939. J. J. McCABE 2,143,739
MOTOR SUPPORT
Filed Dec. 14, 1934
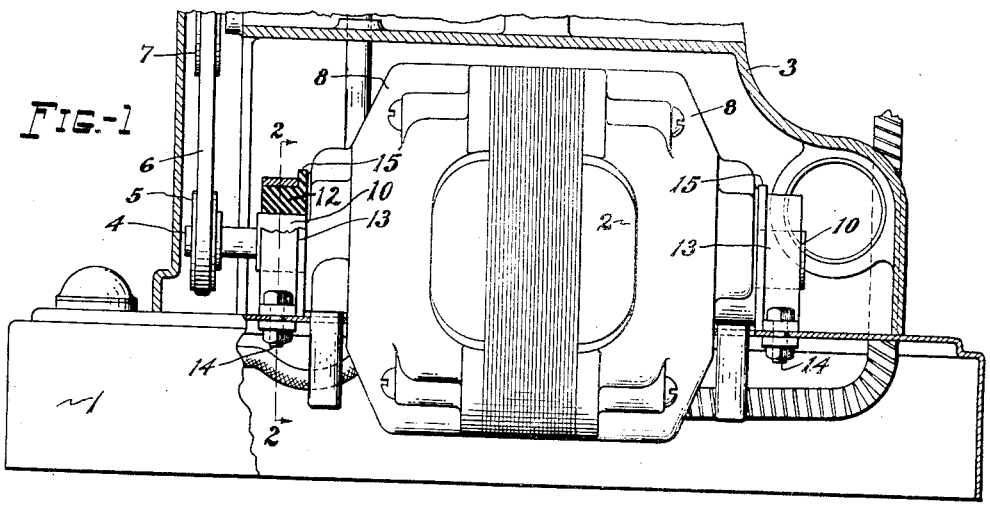
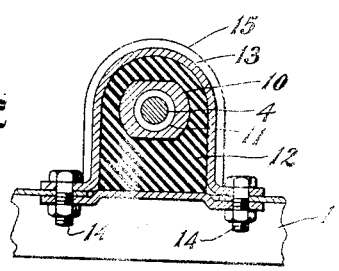
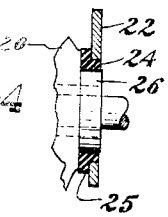
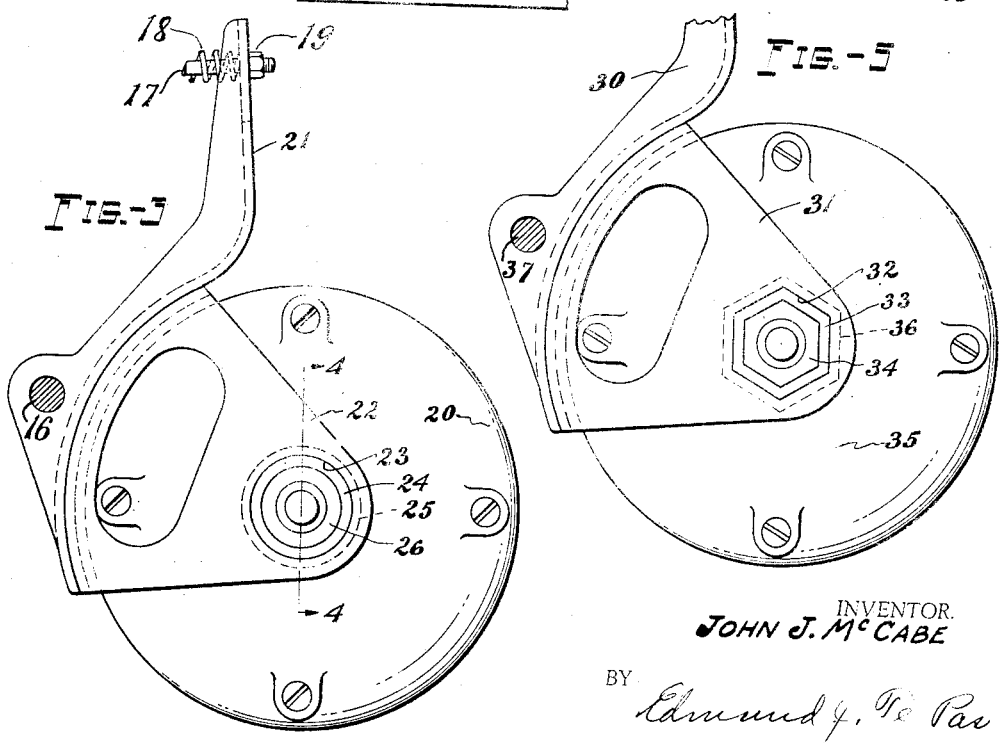
INVENTOR.
JOHN J. McCABE
BY
ATTORNEY.

Patented Jan. 10, 1939

2,143,739

UNITED STATES PATENT OFFICE 2,143,739

MOTOR SUPPORT

John J. McCabe, Cleveland, Ohio, assignor to The Apex Electrical Manufacturing Company, Cleveland, Ohio, a corporation of Ohio Application December 14, 1934, Serial No. 757,546

7 Claims. (Cl. 248—26)

This invention relates to supports for dynamo-electric machines, and in particular yielding supports for alternating current electric motors, and it constitutes in part a continuation of my co-pending application Serial No. 664,767, filed April 6, 1933 now a patent No. 2,067,719 of January 12, 1937 for Ironing machine structure.

One of the objects of this invention relates to the provision of a yielding support for a device of the class described, which will effectively dampen the vibrations set up in the device due to its operation and prevent transmission of such vibrations to the suporting structure, thereby insuring smooth and noiseless operation of the device.

Another object of the invention relates to the provision of a flexible support for electric motors which permits slight movements of the motor in axial and radial directions; while at the same time permitting relatively larger movements of the motor circumferentially about its axis.

Another object of the invention relates to the provision of a yielding, resilient support for an electric motor which will permit the ready installation or removal of the motor with respect to its securement or support.

A further object of the invention relates to the provision of a generally simplified and inexpensive cushioning support for a motor or a dynamo-electric machine.

With these and other objects in view, the invention consists in the novel construction, arrangement and combination of parts, hereinafter illustrated and described in some of its embodiments in the accompanying drawing, and particularly pointed out in the appended claims.

In the accompanying drawing forming a part of this specification: Figure 1 is a side elevational view of a motor mounting embodying the invention; the motor support at one end being broken away and shown in section; Figure 2 is an enlarged detail sectional view of one of the motor supports taken on line 2—2, Figure 1; Figure 3 is a side elevational view of a motor and a modified form of motor mounting; Figure 4 is a detail sectional view taken on line 4—4, Figure 3, illustrating the modified form of motor mounting shown in this figure; and Figure 5 is a side elevational view of a motor and another modified form of motor mounting.

The structure embodying the form of the invention illustrated in Figures 1 and 2, comprises a base plate member or support 1 for a motor 2, carried within the housing 3, with the lower portion of the motor projecting through a suitable aperture formed in the base 1 by way of which the motor is installed or removed. The armature shaft 4 of the motor is provided with a belt pulley 5 for the purpose of driving a belt 6 which connects the motor to a pulley 7, operatively associated with the device which the motor is intended to drive.

The frame of the motor includes similarly formed end-caps 8, 8 having axially extending bosses 10, 10 carrying suitable anti-friction bushings 11, 11, in which the ends of the armature shaft 4 are journaled. The marginal outline of the bosses is non-circular in cross-section and these bosses are received in blocks 12, 12 of yielding, flexible elastic material, as for example rubber, having an opening of similar shape to that of the bosses and snugly receiving the same. The outer margin of each of the blocks is also non-circular in cross-section, the top and sides being of U-shaped outline and engaged by U-shaped straps 13 which are secured to the base or support 1 by any suitable means such as the bolts 14, 14.

The blocks are each provided with an offset part or flange 15 which serves to separate and insulate the straps from the end-caps of the motor, while at the same time permitting relatively slight axial movements of the motor. In tightening the bolts, the blocks are compressed to some extent and while they permit radial and gyrational movements of the motor, such movements are restrained by the blocks within rather small limits. Due to the rather small diameter of the axially extending bosses, the support will permit relatively large angular vibrational movements of the motor about its axis, such as are ordinarily set up in the operation of an alternating current motor due to the pulsating torque of this type of motor.

The blocks are of relatively inexpensive construction and the securement of the motor to its support is one which may be easily and quickly effected by an ordinary workman. The blocks by reason of their yielding, flexible character, cannot set up stresses or strains in the motor housing, and for this reason, will not throw the motor bearings out of line and cause binding of the motor shaft in its bearings.

It should be noted too in connection with the form of the invention illustrated in Figures 1 and 2, that the blocks rest directly upon the base of the machine with which the motor is used and that this form of support does not require the use of brackets or other additional structures for supporting the motor.

In the form of the invention illustrated in Figure 3, the motor 20 is carried by a suitable supporting bracket 21, having oppositely arranged arms or standards 22, 22 fixed thereto, one at each end of the motor. Each of the standards has an aperture 23 for reception of an elastic bushing 24 located between the arms 22 and the ends of the motor. The bushings 24 are tightly fitted about the axially extending bosses 26 of the motor, which bosses in this form of the invention are shown as being circular in cross-section.

The bushings 24 are also in tight engagement with the surfaces defining the apertures 23 provided by the arms 20, and these arms are adapted to tightly press against the annular shoulder 25 of the bushings so that the frame of the motor is flexibly yet non-rotatably carried by the supporting structure. This arrangement permits slight gyrational and axial movements as well as relatively large angular vibrations of the motor about its axis as occasioned by unbalanced conditions and the pulsatory torque of the motor when it is running.

The arms or standards 22 may be constructed to have sufficient resilience to permit the securement of the motor to its support merely by springing or spreading the standards a slight extent to fit the ends of the standards over the flexible bushings, or if desired, one or both of the standards may be detachably secured with respect to the supporting brackets 21 so that upon their securement thereto the motor may be clamped between such arms or standards.

In the form of the invention illustrated in Figure 5, a supporting bracket 30 and oppositely disposed arms 31, 31 similar to the construction shown in Figure 3, are provided. The arms 31 are each provided with a non-circular aperture 32 for receiving a flexible bushing 33 of similar outline. Each of the bushings 33 embraces a non-circular boss 34 which extends outwardly from each of the ends of the motor 35. The bushings 33 are flanged at 36 to prevent the arms or standards 31 from contacting with the frame of the motor, and at the same time to permit slight axial movements of the motor with respect to its support.

The mounting or support shown in Figure 5 operates substantially the same as that shown in Figure 3, differing therefrom principally in that it is not necessary to have the arms 33 grip the bushing so tightly as is the case in the arrangement shown in Figure 3 which relies upon the frictional resistance of the parts to prevent rotation of the motor frame with respect to its support.

In the forms of the invention shown in Figures 3 and 5, the corresponding brackets 21 and 30 are each provided with holes for receiving supporting rods 16 and 37 respectively by means of which the motor is adjustably supported, there being provided a fixed bolt 17, its nut 19 and a spring 18, as shown in Figure 3 for yieldingly holding the motor in its adjusted position against the pull of the belt engaging the motor pulley substantially as shown and described in the copending application of W. A. Frantz and J. J. McCabe, Serial No. 613,999 filed May 27, 1932 for Washing machine.

The present invention is designed primarily to provide a simple and inexpensive mounting for electric motors to which the motor may be quickly and easily secured and which permits relatively large angular vibrational movements of the motor about its axis, as well as relatively small movements of the motor in radial and axial directions; the mounting further serving to prevent the transmission of vibrations to the supporting structure, thereby reducing wear on the armature shaft and its bearings and insuring quiet and vibrationless operation of the motor.

Furthermore, it is to be understood that the particular forms of motor support shown and described, and the particular procedure set forth are presented for purposes of explanation and that various modifications of said apparatus and procedure can be made without departure from this invention as described in the appended claims.

Having thus described my invention, what I claim is:

1. In a device of the character described, a motor, a bearing member therefor having an exterior surface of polygonal form in cross-section, a shaft journaled in said bearing member, a cushioning block having a polygonal aperture in which said bearing member fits, said block having exterior non-circular faces, a supporting member for said block having an aperture for the accommodation of said motor, and a detachable means engaging three sides of said block for tightly clamping said block to said supporting member close to the aperture thereof.

2. In a device of the character described, an apertured base plate member, an electric motor having non-circular end portions, and means for flexibly supporting said motor solely from the end portions thereof with a part of the motor extending through the aperture of said base plate member; said means comprising cushioning blocks carried by the base plate member having apertures for receiving the non-circular end portions of said motor and brackets for securing said blocks with respect to said base plate member and the end portions of said motor.

3. The combination with an alternating current motor of a housing and supporting structure therefor comprising, an apertured base plate and a hollow enclosure thereover defining a compartment for the reception of said motor, said motor being insertable and removable with respect to said compartment by way of the aperture in said base plate, blocks with non-circular apertures carried by the base plate for supporting the motor solely from the opposite end portions thereof, said motor having end bosses of non-circular outline non-rotatably received in the apertures of said blocks which apertures are complementary in outline to the outline of the bosses, and means for securing said blocks to the base plate.

4. The combination with a dynamo-electric machine having a housing provided with axially disposed projecting bosses at its ends with polygonal external surfaces and an armature shaft journaled in said bosses, of a supporting structure for supporting said machine from the opposite ends of said housing, and a block of elastic rubber non-rotatably mounted with respect to said supporting structure, each rubber block having a polygonal aperture in which one of said bosses fits, said housing and said supporting structure having means engaging inner and outer faces of the cushioning blocks to yieldingly restrain axial movement of the housing, said housing being otherwise free of any connection with respect to said supporting structure.

5. The combination with a dynamo-electric machine having a housing provided with axially disposed projecting bosses at its ends which are externally non-circular and an armature shaft journaled in said bosses, of a supporting structure for supporting said machine from the opposite ends of said housing, and a block of elastic rubber non-rotatably mounted with respect to said supporting structure, each rubber block having a non-circular aperture in which one of said non-circular bosses fits, said housing having a shoulder engaging the inner face of each cushioning block around the margin of the boss receiving opening and said supporting structure having means engaging an outer face of the block mounted therein along a margin thereof, said housing being otherwise free of any connection with respect to said supporting structure.

6. The combination with a dynamo-electric machine having a housing provided with axially disposed projecting bearing portions at its ends, and an armature shaft journaled in said bearing portions, a supporting structure for supporting said machine from the opposite ends of said housing, a one-piece cushioning block of yielding elastic material non-rotatably secured upon each projecting bearing portion of the housing and non-rotatably secured with respect to said supporting structure, said projecting bearing portions having shoulders bearing against the inner faces of said blocks and said supporting structure having means for holding said blocks against outward movement whereby axial movements of the housing are cushioned, said housing being otherwise free of any connection with respect to said supporting structure.

7. In a resilient mounting for an electric motor, a motor housing having an end frame provided with a boss member, a resilient rubber block support member, one of said members having a non-circular recessed portion and the other of said members having a non-circular exterior portion to fit within said recessed portion, said rubber block member being further characterized by having a second non-circular portion, a supporting base arranged paralled to the motor axis, an element projecting from said base having an opening corresponding in shape to the second non-circular portion enclosing said last-named portion, and means to prevent axial movement of said rubber block member with respect to said boss and said element.

JOHN J. McCABE.